United States Patent
Barbieri et al.

(10) Patent No.: US 6,212,160 B1
(45) Date of Patent: Apr. 3, 2001

(54) AUTOMATED SELECTION OF A PROTOCOL BY A COMMUNICATING ENTITY TO MATCH THE PROTOCOL OF A COMMUNICATIONS NETWORK

(75) Inventors: Raymond A. Barbieri, Campbell; Gregory F. Crofton, Pleasanton; Dustin M. Donaldson, Fremont; Marius C. Milner, Santa Clara, all of CA (US)

(73) Assignee: Avaya Technlogy Corp., Miami Lakes, FL (US)

( * ) Notice: Subject to any disclaimer, the term of this patent is extended or adjusted under 35 U.S.C. 154(b) by 0 days.

(21) Appl. No.: 09/047,007

(22) Filed: Mar. 24, 1998

(51) Int. Cl.[7] .............................. H04Q 1/30; G06F 13/38; G06F 11/00
(52) U.S. Cl. ....................... 370/217; 370/465; 370/401; 709/230
(58) Field of Search ..................................... 370/401, 217, 370/465, 466, 467, 255, 225, 228; 709/203, 230; 713/1

(56) References Cited

U.S. PATENT DOCUMENTS 5,425,028 * 6/1995 Britton et al. ...................... 709/230
5,754,552 * 5/1998 Allmond et al. .................... 370/465
5,802,042 * 9/1998 Natarajan et al. ................... 370/465
5,870,399 * 9/1998 Smith .................................. 370/465
6,038,603 * 3/2000 Joseph ................................. 709/230

* cited by examiner

Primary Examiner—Alpus H. Hsu
Assistant Examiner—Afsar M. Qureshi
(74) Attorney, Agent, or Firm—David Volejnicek

(57) ABSTRACT

A client application (121) is automatically adapted to communicate between its corresponding terminal (107–109) and a server (101) via any communications network (102–104) that supports any of the protocols that the client application supports. The client application is administered (135) during installation to support a plurality of protocols one of which is designated (225) as being preferred. The application first attempts (300–310) to establish a communications channel by using the preferred protocol. If that fails, the application attempts (315–325) to establish the communications channel by using another supported protocol. Success of either attempt leads the application to determine (340) if another channel is needed, and if so, to attempt to establish it by using the successful protocol. Failure of this last attempt leads the application to repeat the first attempt.

12 Claims, 3 Drawing Sheets

AUTOMATED SELECTION OF A PROTOCOL BY A COMMUNICATING ENTITY TO MATCH THE PROTOCOL OF A COMMUNICATIONS NETWORK

TECHNICIAN FIELD

This invention relates to communicating entities and their interfaces with communications networks.

BACKGROUND OF THE INVENTION

Different communications networks may use different communications protocols. For example, some intranets use the Internet transmission control protocol (TCP), while other intranets use the Novell internetwork packet exchange (IPX)/sequenced packet exchange (SPX) protocol. The different protocols are incompatible; therefore, any communications entity—whether hardware or software—that is intended for use with a network must be configured to support the protocol of that network. However, the knowledge of which protocol needs to be supported and the skill to configure the communications entity are beyond those of many users. Therefore, adapting a communications entity to work on a network often requires the services of a technician. This is costly and causes delays.

SUMMARY OF THE INVENTION

This invention is directed to solving these and other problems and disadvantages of the prior art. According to one aspect of the invention, a communications entity is configured to communicate using any of a plurality of communications protocols, and it initially attempts to communicate by using a preferred one of the protocols, and attempts to communicate by using another one of the protocols if the initial attempt fails, whereby the entity is automatically adapted to communicate on any communications network that supports any of the protocols. Significantly, the adaptation is automatic, made without user or other human assistance. Preferably, a successful attempt establishes a first communications channel and, if needed, the entity responds to a successful attempt by again attempting to communicate by using the protocol of the successful attempt, in order to establish a second communications channel. Thus, the entity can have a plurality of channels in existence at the same time. Significantly, different ones of the plurality of channels may employ different ones of the plurality of protocols.

According to another aspect of the invention, a method of communicating on a network that supports at least one of a plurality of communications protocols begins by first attempting to communicate on the network by using a preferred one of the plurality of protocols. Communicating in the preferred protocol continues if this first attempt succeeds. But in response to failure of this first attempt, communicating on the network is further attempted one or more times by using another one (or more) of the plurality of protocols. Again, communicating in the other protocol continues if a further attempt succeeds, but in response to failure of the further attempts, attempts to communicate on the network are abandoned. Preferably, a successful first or a further attempt establishes a first communications channel and, in response to the success, a second communications channel is established, if need be, by thirdly attempting to communicate on the network by using the protocol of the previous successful attempt. If the third attempt fails, the first attempt and—if needed—the further attempts are repeated in an effort to establish the second channel. Aside from the method, an apparatus that performs the method and a computer readable medium containing software which, when executed in a computer, causes the computer to perform the method also fall within this aspect of the invention.

According to yet another aspect of the invention, the above-characterized method begins with initialization of a server with information identifying the preferred and the other protocols, and the server seeding each client of the server with the initialization information, whereupon the method steps are performed by each of the seeded clients when attempting to communicate with the server. The server then communicates with each client across the network by using whichever of the protocols the client initiated the communication in.

These and other advantages and features of the invention will become more apparent from the following detailed description of an illustrative embodiment of the invention considered together with the drawing.

DETAILED DESCRIPTION

Figure 1:
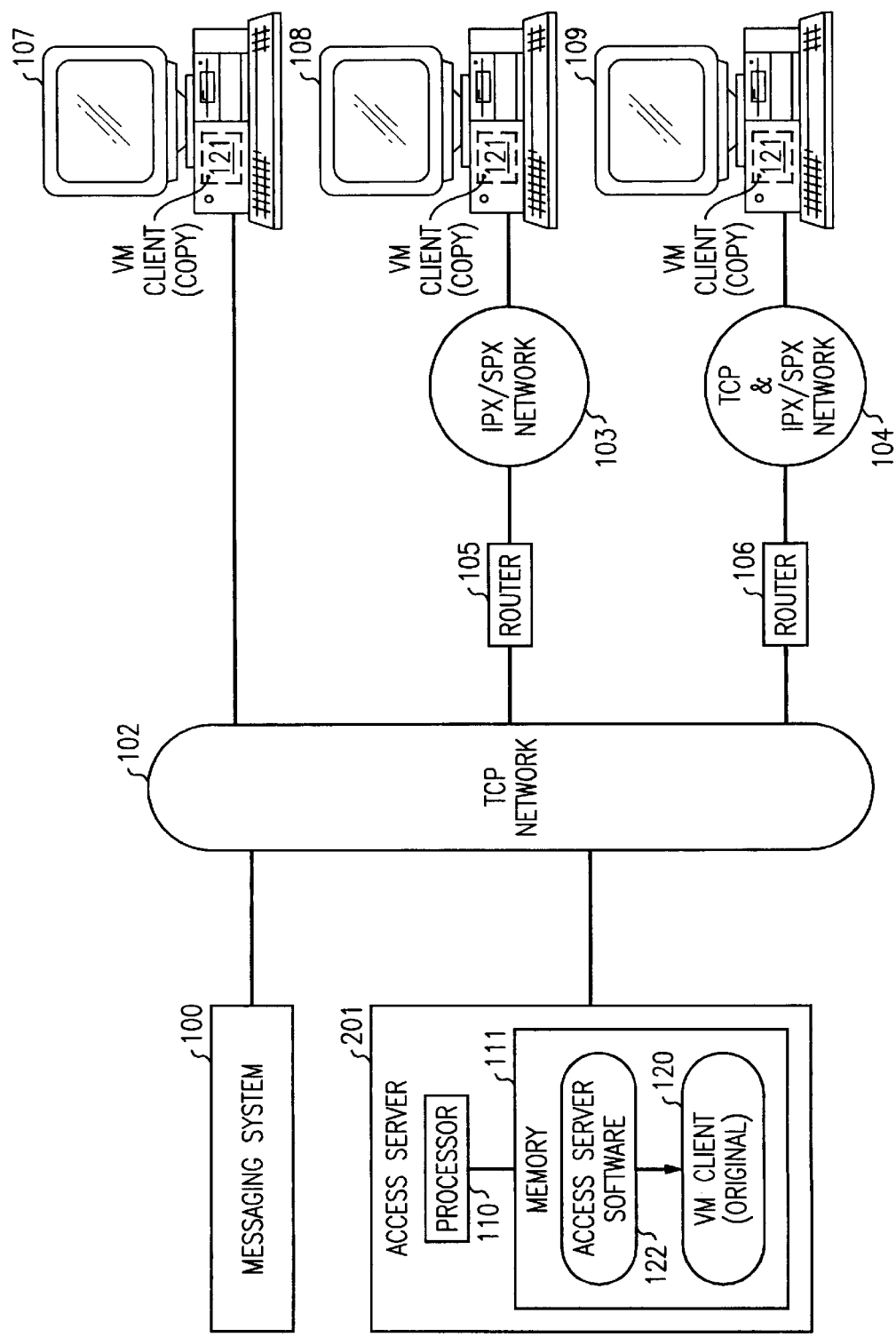
FIG. 1 is a block diagram of a communications system that includes an illustrative embodiment of the invention.

FIG. 1 shows an illustrative communications system that comprises a messaging system 100, such as the Octel Serenade or Aria voice messaging system, and an access server 201, which functions as an access gateway to messaging system 100, interconnected by a TCP network 102 with a plurality of communications endpoints represented by a terminal 107. Also shown are an IPX/SPX network 103 that serves a plurality of communications endpoints represented by a terminal 108, and a network 104 which supports both the TCP protocol and the IPX/SPX protocol and serves a plurality of communications endpoints represented by a terminal 109. To enable terminals 107–109 to communicate with each other and with messaging system 100, network 102 is interconnected with networks 103 and 104 via routers 105 and 106, respectively.

Figure 2:
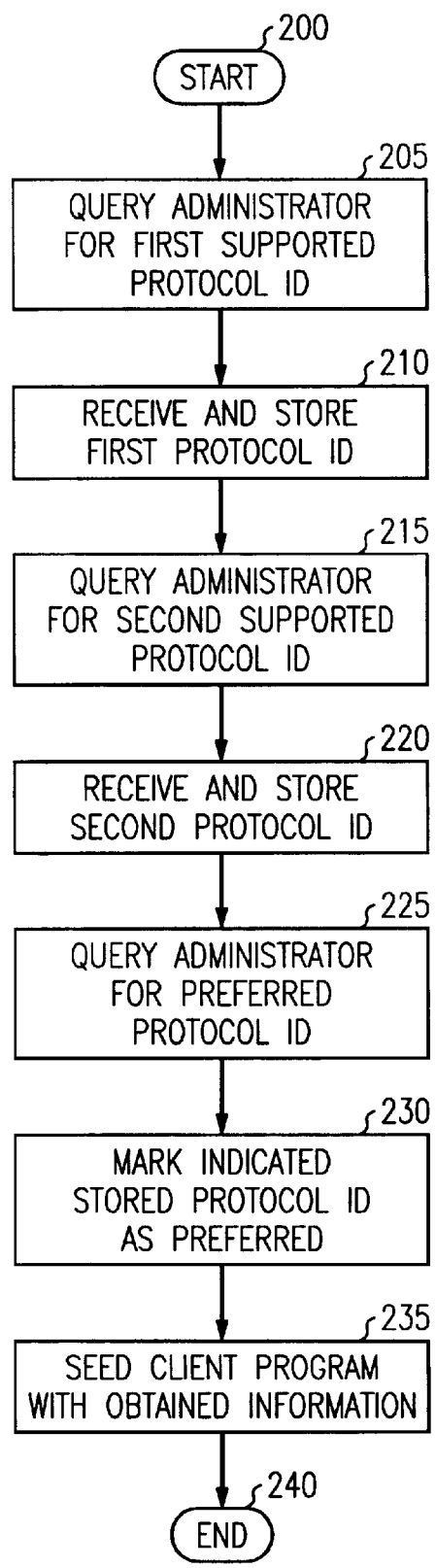
FIG. 2 is a functional flow diagram of selected initialization operations of access server software of an access server of the system of FIG. 1.

Access server 201 stores access server software 122 in its memory 111 for execution by its processor 110. Access server software 122 is illustratively the conventional Octel Access Server modified as shown in FIG. 2. As a part of installation of software 122 on access server 101, at step 200, processor 110 starts execution of software 122 from memory 111. Processor 110 queries an administrator of access server 101 (the installer of software 122) for the identity of a first protocol supported by access server 101, at step 205. Upon receiving the first protocol ID, processor 110 stores it in memory 111, at step 210, and then queries the administrator for the identity of a second supported protocol, at step 215. Upon receiving the second protocol ID, processor 110 stores it in memory 111, at step 220; if a second protocol is not supported, processor 110 receives a null identifier. Optionally, access server 101 may support more than two protocols, and therefore may query the administrator for identifiers of these additional protocols. Having received and stored the identities of the supported protocols, processor 110 queries the administrator for the identity of the preferred one of the supported protocols, at step 225. Upon receiving the preferred protocol's ID, processor 110 marks that stored ID in memory 111 as the preferred protocol, at step 230. Processor 110 then "seeds" (populates) data fields of an original 120 of a corresponding client program—illustratively the Octel Visual Messenger—with the information that it obtained at steps 205–230, at step 235, and ends initialization, at step 240.

Following step 235, copies 121 of the seeded original 120 of the VM client program are distributed to terminals 107–109 in any desired conventional manner—for example, directly via CD-ROMs or diskettes, or indirectly by mounting seeded original 120 of the program on a server from which copies 121 thereof may be downloaded and installed on terminals 107–109. Distributed copies 121 are stored in the terminal's memories for execution by the terminals' processors, in a conventional manner. Then, when a user of a terminal 107–109 wishes to communicate with messaging system 100, the user selects an icon that invokes execution of that terminal's VM client program 121. VM client program 121 communicates with access server 101 on behalf of the corresponding terminal, and access server 101 in turn communicates with messaging system 100 on the terminal's behalf. Access server 101 communicates with a terminal 107–109 in whatever protocol the terminal used to initiate the communication.

Figure 3:
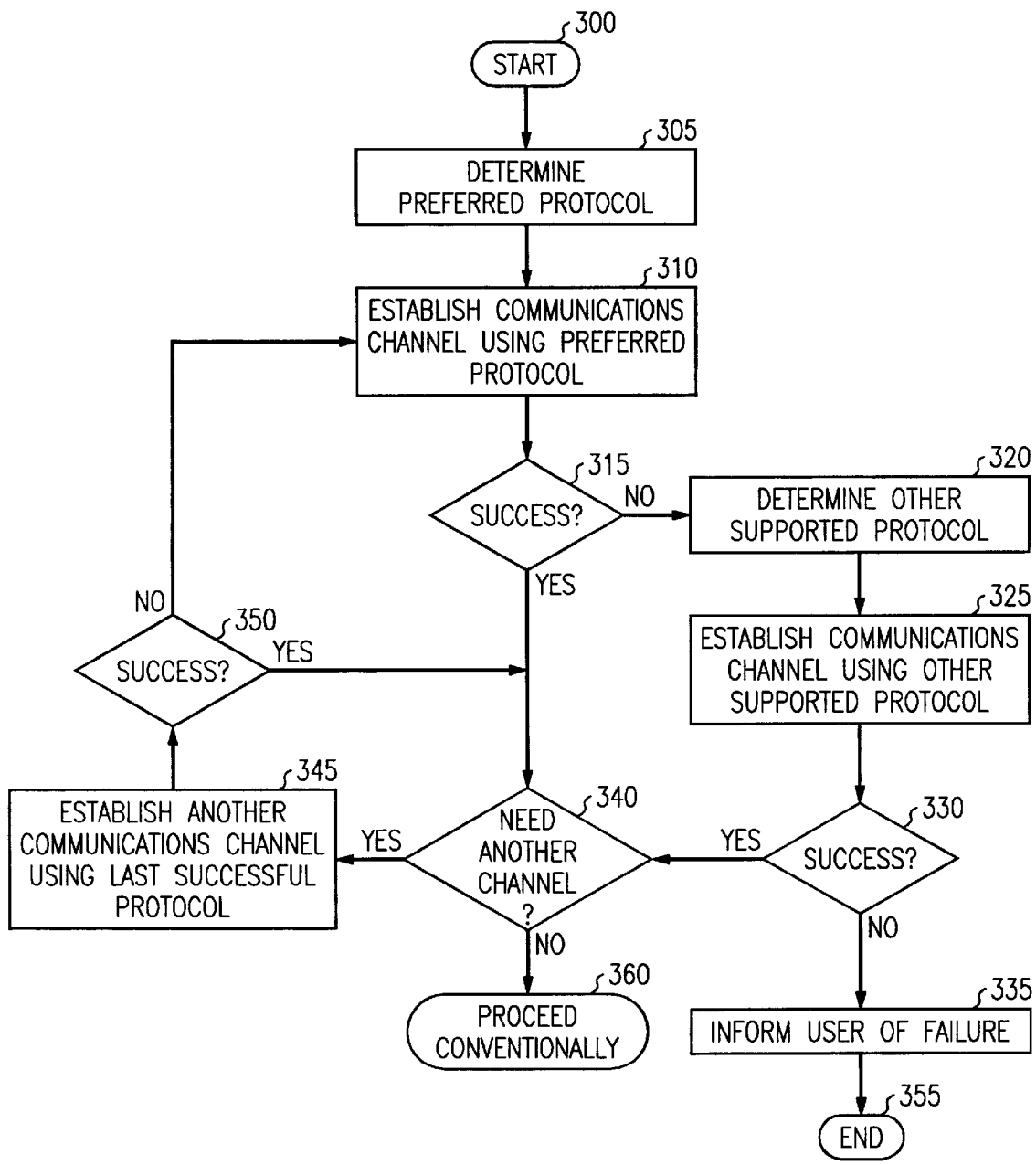
FIG. 3 is a functional flow diagram of selected operations of a VM client program of a terminal of the system of FIG. 1.

FIG. 3 shows how a VM client program 121 effects communications with access server 101. When a terminal 107–109 starts to execute its copy of client program 121, at step 300, it determines—from the information with which client program 121 was seeded by access server software 122—which supported protocol is marked as the preferred protocol, at step 305, and firstly attempts to communicate on network 102 by using that preferred protocol, in order to establish a communications channel to the access server 101, at step 310. For example, if the TCP protocol is marked as the preferred protocol, terminal 107–109 would use the TCP protocol to attempt to establish a channel to access server 101, and terminals 107 and 109 would succeed but terminal 108 would fail.

If the attempt at communicating, i.e., the channel establishment, succeeded, program execution proceeds to step 340 where it continues to communicate in the preferred protocol. If channel establishment failed, as determined at step 315, terminal 107–109 determines which other protocol is indicated to be supported, at step 320, and then tries to communicate on network 102 by using this protocol in order to establish the communications channel, at step 325. For example, if the other supported protocol is IPX/SPX, terminal 107–109 would use this protocol, and the attempt of terminal 108 would succeed. If the attempt failed, as determined at step 330, terminal 107–109 informs its user of the failure, at step 335, and then ends execution of client program 121. If the attempt succeeded, program execution proceeds to step 340, where it continues to communicate by using the successful protocol.

At step 340, terminal 107–109 determines whether a second communications channel is needed. For example, the first channel may be used for a digital graphical user interface to message system 100, and now the user of the corresponding terminal may want to either retrieve or view a voice or fax message from message system 100; this would require a second channel. If a second channel is not needed, terminal 107–109 proceeds conventionally, at step 360. If a second channel is needed, terminal 107–109 attempts to communicate on network 102 in order to establish a second channel to the access server 101, by using the last-used protocol whose use succeeded in establishing a channel to that terminal, at step 345. If the attempt succeeded, as determined at step 350, terminal 107–109 returns to step 340 to determine if yet another channel is needed. If the attempt failed, terminal 107–109 returns to steps 310 et seq. to try and establish another channel.

In summary, client applications can effect logical connections (channels) between client terminals and a server by using a variety of network protocols. When a client wishes to effect a logical connection between a terminal and the server, it tries to use each of these protocols in turn (starting with the preferred protocol). The first protocol to succeed is used for all subsequent connections, unless a logical connection attempt fails. In this case, the client returns to connecting using the other protocols (again starting with the preferred protocol), while keeping existing connections open. This means that one client terminal might be connected to the server using multiple protocols, and be using them all simultaneously for dependent or independent activities. For each protocol, it is possible for connection attempts to fail but for existing logical connections to continue to function normally.

Of course, various changes and modifications to the illustrative embodiment described above will be apparent to those skilled in the art. For example, the invention is not limited to use with two protocols but may be used in any complicated network environments that use multiple different protocols. Such changes and modifications can be made without departing from the spirit and the scope of the invention and without diminishing its attendant advantages. It is therefore intended that such changes and modifications be covered by the following claims.

What is claimed is:

1. A method of communicating on a network, comprising:
(A) a first device firstly attempting to communicate on the network with a second device by using a first one of a plurality of communications protocols;
(B) in response to success of the first attempting, the first device communicating with the second device in the first protocol on a first communications channel established by successful said first attempting;
(C) the first device secondly attempting to communicate on the network with the second device by using a different second one of the plurality of communications protocols while communicating on the first communications channel with the second device in the first protocol; and
(D) in response to success of the second attempting, the first device communicating with the second device in the second protocol on a second communications channel established by successful said second attempting, while communicating with the second device on the first communications channel in the first protocol.

2. The method of claim 1 wherein:
the first device is one of a client and a server, and the second device is the other of the client and the server.

3. A method of communicating on a network that supports a plurality of communications protocols, comprising the steps of:
(A) a first device firstly attempting to communicate on the network with a second device by using a preferred one of the plurality of protocols;
(B) in response to success of the first attempting, the first device continuing to communicate with the second device in the preferred protocol on a first communications channel established by successful said first attempting;

(C) in response to failure of the first attempting, the first device secondly attempting to communicate on the network with the second device by using another one of the plurality of protocols;

(D) in response to success of the second attempting, the first device continuing to communicate with the second device in the other protocol on the first communications channel established by successful said second attempting;

(E) the first device attempting to establish a second communications channel by thirdly attempting to communicate on the network with the second device by using the protocol of the successful first or second attempting, while communicating with the second device on the first communications channel in the protocol of the successful first or second attempting;

(F) in response to failure of the third attempting, the first device attempting to establish the second communications channel by fourthly attempting to communicate on the network with the second device by using one of the plurality of protocols other than the protocol of the successful first or second attempting, while communicating with the second device on the first communications channel in the protocol of the successful first or second attempting; and (G) in response to success of the fourth attempting the first device continuing to communicate with the second device in the one protocol other than the protocol of the successful first or seconed attempting on the second communications channel established by successful said fourth attempting, while communicating with the second device on the first communications channel in the protocol of the successful first or second attempting.

4. The method of claim 3 wherein the step (A) is preceded by the further steps of:

initializing a server with information identifying the preferred and the other protocols, and the server seeding each client of the server with the initializing information; and wherein the steps (A)–(E) are performed by each of the seeded clients when attempting to communicate with the server.

5. An apparatus comprising a processor that executes instructions to effect the method of claim 1 or 1 or 2.

6. A computer-readable medium containing software which, when executed in a computer, causes the computer to perform the method of claim 1 or 1 or 2.

7. A first device capable of communicating on a communications network in any of a plurality of communications protocols, the first device being configured for firstly attempting to communicate with a second device by using a preferred one of the plurality of protocols, responsive to failure of the first attempt by secondly attempting to communicate with the second device by using another one of the plurality of protocols, and responsive to success of the first or the second attempt by continuing to communicate with the second device on a first communications channel established by the successful first or second attempt in the protocol of the successful first or second attempt, the first device being further configured for thirdly attempting to establish a second communications channel with the second device by using the protocol of the successful first or second attempt while communicating with the second device on the first channel in the protocol of the first or second successful attempt, responsive to failure of the third attempt by fourthly attempting to establish the second communications channel by using a protocol other than the protocol of the successful first or second attempt while communicating with the second device on the first channel in the protocol of the successful first or second attempt, and responsive to success of the fourth attempt by continuing to communicate with the second device in the protocol of the fourth attempt on the second communications channel established by the fourth attempt while communicating with the second device on the first channel in the protocol of the successful first or second attempt.

8. The first device of claim 7 wherein:

the first device is one of a client and a server, and the second device is the other of the client and the server.

9. A server for executing a server program for a plurality of communications terminals that connect to the server by a communications network which supports a plurality of communications protocols, wherein the server operating under control of the server program responds to receipt of a communication using a first one of the plurality of protocols from one of the plurality of terminals by communicating with the one terminal on a first communications channel on the network by using the first protocol, and responds to receipt of a communication using another one of the plurality of protocols from the one terminal by communicating with the one terminal on a second communications channel on the network by using the other one of the plurality of protocols while simultaneously communicating with the one terminal on the first communications channel by using the first protocol.

10. The server of claim 9 wherein the server program is initialized with information identifying the first and the other protocols, and the server operating under control of the server program seeds each client program of the server with the initializing information and thereafter responds to said receipt of said communications from the seeded client programs executing on the terminals.

11. A first device capable of communicating on a communications network in any of a plurality of communications protocols, the first device being configured to firstly attempt to communicate with a second device by using a first one of the plurality of protocols, and responsive to success of the first attempt by continuing to communicate with the second device on a first communications channel established by the first attempt in the protocol of the first attempt, the first device being further configured to secondly attempt to communicate with the second device by using a different second one of the plurality of protocols while communicating with the second device on the first communications channel in the first protocol, and responsive to success of the second attempt by continuing to communicate with the second device on a second communications channel established by the second attempt in the protocol of the first attempt while communicating with the second device on the first communications channel in the first protocol.

12. The first device of claim 11 wherein:

the first device is one of a client and a server, and the second device is the other of the client and the server.

* * * * *